United States Patent [19]
Ritter

[11] Patent Number: 5,414,206
[45] Date of Patent: May 9, 1995

[54] METHOD AND PROCESS FOR RENDERING WASTE SUBSTANCES HARMLESS

[76] Inventor: Robert A. Ritter, 1705 Nelson Street, No. 108, Vancouver, British Columbia, Canada, V6G 1M6

[21] Appl. No.: 866,472

[22] Filed: Apr. 10, 1992

Related U.S. Application Data

[63] Continuation-in-part of Ser. No. 804,310, Dec. 9, 1991, Pat. No. 5,290,351.

[51] Int. Cl.$^6$ .............................................. C04B 2/02
[52] U.S. Cl. ................................. 588/226; 106/244; 106/250; 106/266
[58] Field of Search .................. 106/244, 250, 266; 588/226

[56] References Cited

U.S. PATENT DOCUMENTS 842,212  1/1907  Kyle ................................. 106/244
4,383,783  5/1983  Kruka et al. ..................... 106/266

*Primary Examiner*—David Brunsman
*Attorney, Agent, or Firm*—Nixon & Vanderhye

[57] ABSTRACT

A method is provided for the treatment of hydrocarbon-contaminated soil by chemical hydrolysis and/or oxidation of said hydrocarbons on the hydrocarbon-contaminated soil. The method includes conditioning lime with a particularly defined fatty-acid activator. The so-conditioned lime is blended with physically-preconditioned, moist, hydrocarbon-contaminated soil, the degree of dispersion being at least near microscopic level. A charge of the such blended lime/soil is conveyed to an enclosed reaction vessel, where hydration of the lime is carried out. The heat of the hydration reaction is retained within the vessel, so that hydrolysis of the fatty acid conditioner and/or hydrocarbon contaminants in the soil is effected. Air or oxygen-enriched air is substantially-simultaneously introduced into the reaction vessel together with steam and/or water as required by the chemical reactions, thereby to effect a flameless, intermediate-temperature oxidation of the hydrocarbons or their hydrolyzed degradation products. Such decontaminated soil product is discharged from the reaction vessel by passing the soil product, in dry, dusty hydrophobic form through a treating zone where it is sprayed with a surfactant. The surfactant-treated decontaminated soil product is passed to a blender where it is mixed with sufficient water to provide a substantially dust-free product.

15 Claims, 1 Drawing Sheet

METHOD AND PROCESS FOR RENDERING WASTE SUBSTANCES HARMLESS

RELATED APPLICATION

This invention is a continuation-in-part of application Ser. No. 07/804,310 filed Dec. 9, 1991 now U.S. Pat. No. 5,290,351, the entire contents of which are incorporated herein by reference.

BACKGROUND OF THE INVENTION

1. Field of the Invention

This invention relates to a process and system for the treatment of hydrocarbon-contaminated soil.

2. Description of the Prior Art

For some time now, the art has been faced with the problem of the treatment of hydrocarbon-contaminated soils. Such a problem relates to soil which may have been contaminated through intentional or accidental spills of petroleum oils, hydrocarbon solvents or other, semi-volatile or non-volatile organic materials. Such contaminants may extend over large tracts of land and may directly or indirectly, e.g. through subsequent contamination of an underlying aquifer, constitute an extreme threat to wildlife, vegetation or human health. Conventional methods, e.g. land farming are not very suitable.

Another problem relates to oil well sumps. Oil well sumps are artificial pits used as dump sites for all kinds of liquid and viscous wastes. The physical consistency of the sump varies according to the random materials dumped. Typically, however, in the absence of a water layer, the consistency is pasty. Inasmuch as sumps create traps for wild fowl, there is an increasing demand for elimination of sumps, especially those not being commercially used. In addition, they are unsightly. The traditional treatment has been to dump and mix dirt into the sump and thereby soak up sufficient of the oil until the dirt-sump material can be moved by conventional equipment. The mixture is then spread to dry. This treatment has not been acceptable because the mixture bleeds oil and chemicals. Over months and years, this dirt-sump mixture oozes oil and becomes almost as objectionable as the original oil sump. This unsatisfactory type of treatment has called for an improved solution to the ecological problem of sump elimination.

The increasing use of hydrophobic substances, e.g. oils and oily substances, as well as macromolecular substances, has created new problems which arise mainly out of the handling of these substances. Particularly, the use of old oil, heating oils, lubricating oils and diesel fuels often leads, either intentionally or through negligence, and often due to emergency situations, to dangerous contamination of the environment.

There are a number of methods for rendering harmless such oils or oily substances which, in a single phase or in multiple phase systems, entail an endangerment of the environment. For example, oil can be chemically reacted by being burned, for example, or biologically degraded. The combustion method used frequently in combatting oil damage results in considerable air pollution if the burning is performed in the open rather than in expensive combustion apparatus.

The use of adsorbents solves such problem only when the oil can be fixed with them in such a manner that it is chemically unaltered but is encapsulated or otherwise isolated or is accessible to biological degradation and no longer constitutes any danger to the environment. With the known adsorptive agents, e.g. activated charcoal, kieselguhr or bentonite, waste oil, for example, can be adsorptively bound only with difficulty. Large amounts of oil may cement the adsorptive agent, especially in the case of high-viscosity oils, making further processing difficult.

It has furthermore been proposed in various ways to treat porous mineral substances with hydrophobic substances for the purpose of improving their adsorptive characteristics. In this manner hydrophobic waste substances can be preferentially bound, while the water is no longer primarily absorbed. In such adsorptive agents, such as hydrophobized pearlite, however, the absorptive capacity is greatly reduced, since the mineral starting material is partially sealed by surface treatment with hydrophobizing substances, so that the inner cavities are no longer accessible.

It is particularly important that the substances which are adsorptively bound by the known processes are so fixed on the adsorptive agent that they no longer constitute any danger to the environment.

In addition to the general, mainly unsatisfactory procedures for the problems of disposal of such wastes discussed above, the patent literature has purported to provide solutions to these problems. For example, one solution to the problem was said to be provided in U.S. Pat. No. 3,720,609, patented Mar. 13, 1973 by C. L. Smith et al. That patent provided a procedure whereby waste sludges containing small amounts of certain types of reactive materials were treated by adding, to such sludges, materials capable of producing aluminum ions, lime and/or sulfate-bearing compounds to produce a composition containing sulfate ions, aluminum ions and equivalents thereof, and calcium ions and equivalents thereof. Over a period of time such compositions hardened by the formation of calcium sulfo-aluminate hydrates.

Another solution to the problem was said to be provided in U.S. Pat. No. 4,028,240 patented Jun. 7, 1977 by F. Marchak Jr. That patent provided a procedure whereby lime, preferably as calcium oxide, was mixed with the contents of sumps, e.g. oil well sumps. The calcium oxide reacted with the materials present and also dehydrated the contents of the sump, causing the sump contents to stiffen.

Yet another solution to this problem was said to be achieved in U.S. Pat. No. 4,018,679 patented Apr. 19, 1977 by F. Boelsing. That patent provided a method for rendering an oil waste material harmless by mixing an alkaline earth metal oxide with a surface active agent which delayed reaction between the alkaline earth metal oxide and water. The mixture was combined with oily material, e.g. a sludge or an oil-contaminated soil. The alkaline earth metal oxide charged with the waste material was reacted with approximately the stoichiometric amount of water to convert the alkaline earth metal oxide to the hydroxide. The alkaline earth metal oxide was preferably calcium oxide and advantageously it was also mixed with a hydrophobizing agent prior to mixture with the oily waste material.

In the patent to Boelsing described above, the composition used was preferably prepared by blending lime with a solid fatty acid (in particular, a commercial grade of stearic acid commonly called stearin) by slowly adding the acid to coarse lime as it was subjected to the process of fine-grinding. The purpose of this operation was to render the lime hydrophobic, thereby delaying its hydration reaction with water and permitting it to be intimately mixed with contaminated soil by mechanical means. Subsequent hydration then resulted in an extremely fine and uniform dispersion of the contaminants, hydrated lime and soil. In practice, however, the purpose of that invention was not always achieved to its optimum.

Nevertheless, the procedures outlined above did not provide a total answer to the problem of effective treatment of hydrocarbon-contaminated soil.

SUMMARY OF THE INVENTION

AIMS OF THE INVENTION

Accordingly, a principal object of the present invention is to provide a novel procedure and process for treating hydrocarbon contaminated soils in a manner which will result in the destruction of the hydrocarbon and the fixation and stabilization of all noxious contaminants.

STATEMENTS OF INVENTION

The present invention, in one of its broadest features, provides a method for the treatment of hydrocarbon-contaminated soil by chemical hydrolysis and/or oxidation of the hydrocarbons in the hydrocarbon-contaminated soil, the method comprising: conditioning lime with a fatty acid activator such fatty-acid activator comprising a liquid blend of a) a mixture of liquid fatty-acids having from about 6 to about 12 carbon atoms, and b) a mixture of glycerides of fatty-acids having from about 8 to about 18 carbon atoms, thereby to provide conditioned lime; intimately blending the conditioned lime at a ratio ranging from about 1 to about 6 to about 1 to about 1 with the mass of, preferably moist contaminated soil having a maximum grain size of less than approximately 5 cm under conditions of high shear thereby to provide blended conditioned lime/soil. The conditions of high shear should be similar to those obtained with the aid of a concrete mixer, e.g. the one known by the trade-mark NIKKO MIXER, a product of Nikko Co., Ltd. in Tokyo, Japan. The degree of dispersion must be at least near microscopic level. A charge of the blended conditioned lime/soil blend is conveyed to an enclosed reaction vessel and hydration of the lime is carried out. The heat of the hydration reaction is retained within the vessel, whereby hydrolysis of the fatty acid conditioner and/or hydrocarbon contaminants in the soil is initiated. Substantially simultaneously air or oxygen-enriched air is introduced into the reaction vessel together with steam and/or water in an amount required to satisfy the stoichiometry of the hydrolysis reaction, and/or steam additionally to maintain the temperature of the reacting mixture, thereby to effect a flameless, intermediate-temperature oxidation of the hydrocarbon contaminants or the hydrolyzed degradation products of the hydrocarbon contaminates, thereby to provide decontaminated soil product. Decontaminated soil product is discharged from the reaction vessel by passing the soil product, in dry, dusty hydrophobic form, through a treating zone where it is sprayed with a surfactant thereby to provide a surfactant treated soil. The surfactant-treated solid is passed to a blender where it is mixed with sufficient water, ranging from about 5% to about 25% based on the quantity of treated solid, to provide a substantially dust-free product.

The present invention, in another of its broad features, provides an improvement in a method for the treatment of hydrocarbon-contaminated soil by chemical hydrolysis and/or oxidation of the hydrocarbons in the hydrocarbon-contaminated soil, including subjecting a blend of conditioned lime as herein-above defined and hydrocarbon-contaminated soil to a hydrolysis reaction in an enclosed reaction vessel to provide a decontaminated sail product, the improvement comprising: introducing air or oxygen-enriched air into the reaction vessel together with steam and/or water in an amount required to initiate, sustain and complete the hydration hydrolysis oxidation reaction, thereby to effect a flameless, intermediate-temperature oxidation of the hydrocarbon to their totally degraded products.

The present invention, in yet another of its broad features provides an improvement in a method for the treatment of hydrocarbon-contaminated soil by chemical hydrolysis and/or oxidation of the hydrocarbons in the hydrocarbon-contaminated soil, including subjecting a blend of conditioned lime as herein-above defined and hydrocarbon contaminated soil to a hydrolysis reaction in an enclosed reaction vessel to provide a decontaminated soil product the improvement comprising discharging decontaminated soil product, from the reaction vessel by passing the decontaminated soil product, in dry, dusty hydrophobic form through a treating zone where it is sprayed with a surfactant. Surfactants suitable for this purpose include aqueous solutions of common commercial and industrial soaps and detergents at concentrations ranging from about 30% to about 80%, and, preferably, aqueous solutions of inorganic alkalis, e.g. sodium hydroxide, at concentrations of about 5% to about 10%.

The present invention, in still another of its broad features provides an improvement in a method for the treatment of hydrocarbon-contaminated soil by chemical hydration and/or oxidation of the hydrocarbons in the hydrocarbon-contaminated soil, including subjecting a blend of conditioned lime, and hydrocarbon-contaminated soil to a hydration reaction in an enclosed reaction vessel, the conditioned lime comprising an intimate blend of lime and a fatty-acid activator, the fatty-acid activator comprising a liquid blend of a) a mixture of liquid fatty-acids having from about 6 to about 12 carbon atoms, and b) a mixture of glycerides of fatty acids having from about 8 to about 18 carbon atoms, thereby to provide conditioned lime, thereby to provide a decontaminated soil product, the improvement comprising: discharging the decontaminated soil product from the reaction vessel by passing the decontaminated soil product, in dry, dusty hydrophobic form through a treating zone where it is sprayed with a surfactant, thereby to provide a surfactant-treated decontaminated soil product; and blending the surfactant-treated decontaminated soil product with sufficient water, in an amount ranging from about 5% to about 25% based on the quantity of surfactant-treated decontaminated soil product, to provide a substantially dust-free product.

OTHER FEATURES OF THE INVENTION

In another feature of the invention, the intimate blending is provided by an apparatus capable of imparting sufficient shear and mixing action e.g., a cement mixer or pug mill.

In one alternative feature of the invention, the reaction vessel is subjected to continuous feeding of the blended soil charge, whereby the blended soil charge moves slowly through the reaction vessel.

In another alternative feature of the invention, the reaction vessel is subjected to batchwise feeding of the blended soil charge, the blended soil charge being retained in the reaction vessel for a predetermined period of time e.g., from about 10 minutes to about 45 minutes, which is adequate for completion of all hydration, hydrolysis and oxidation reactions.

In still another feature of the invention, the direction of flow of the introduced air is co-current to the direction of flow of the blended soil charge through the reaction vessel.

In yet a further feature of the invention, the surfactant comprises an aqueous solution of sodium hydroxide.

GENERALIZED DESCRIPTION OF THE INVENTION

The lime is mixed with the fatty acid in the manner as described in the above-identified copending application of which the present invention is a continuation-in-part. For the sake of completeness, the following additional description is provided herein.

The mixture of liquid saturated fatty acids consists mainly of about 55% caprylic acid and about 42% capric acid by weight, and most preferably consists of: about 1% caproic acid; about 55% caprylic acid; about 42% capric acid and about 2% lauric acid.

The preferred mixture of glycerides is coconut oil; other mixtures of glycerides include babassu oil and palm kernel oil.

In particular, the ratio of liquid saturated fatty acids to glycerides is about 90:10 to about 65:35, with the optimum ratio being about 73:27.

In providing the conditioned lime, the amount of the hydrophobizing composition is selected to be sufficient fully to coat the finely divided lime particles. In practice therefore, this would range from about 0.5% to about 2.5% by weight, with the optimum amount being about 1.0%. The size of the finely divided lime is generally within the range of about $-10$ mesh to submicron sizes, preferably about $-100$; to sub-micron sizes.

The preferred method of providing the conditioned lime comprises feed to the above-described hydrophobizing agent of a spray nozzle; and spraying such hydrophobizing agent into a rising air stream carrying fine lime particles. The pressure gradient across the spray nozzles should be about 10 to about 30 psig. The velocity of upward flow of air is within the range about 50 to about 100 ft/sec.

By the present invention, a novel procedure is provided to the treatment of hydrocarbon-contaminated soil through effective chemical hydrolysis and/or oxidation of the hydrocarbon contaminants. In the first step of the procedure, lime (CaO) is conditioned with a suitable fatty acid activator in accordance with the method described above in the pending application. An appropriate quantity of the conditioned lime, ranging, based on the mass of soil, from about 15% to about 100% as dictated by the quantity of moisture in the feed, the nature of the soil and the type and quantity of the hydrocarbons present and determined through laboratory testing, is intimately blended with physically-preconditioned, moist, hydrocarbon-contaminated soil, which may or may not be further contaminated with noxious heavy metals. While a wide variety of devices capable of imparting the requisite shear and mixing action to the ingredients are commercially available, it is imperative that the degree of dispersion achieved be at the near microscopic level. This provides a blended soil charge.

The blend is, then, transferred to a reaction vessel in either continuous or batchwise fashion. If it is fed in a continuous fashion, the blended soil charge moves slowly through the reactor; if it is fed batchwise, the blended soil charge is retained for a predetermined period of time which may range from about 10 minutes to about 45 minutes and is adequate for completion of all hydration, hydrolysis and oxidation reactions. In either procedure, the reactor design is such that the heat generated during the hydrolysis of the lime in accordance with the reaction:

$$CaO + H_2O \rightarrow Ca(OH)_2$$

is contained within the blended soil charge, thereby causing the temperature to rise to a level at which hydrolysis of the activator and, possibly certain of the hydrocarbon contaminants, is initiated.

Air, or oxygen enriched air, combined with water and/or steam where required by the chemical processes, is also introduced to the reactor to effect a flameless, intermediate temperature oxidation of the original hydrocarbons or the hydrolyzed degradation products of such hydrocarbons. The air or oxygen enriched air flow rate must be sufficiently high to provide an excess of about 50% to about 100% of the stoichiometric oxygen requirements of the oxidation reactions while being limited to a level which will minimize the heat removal from the reaction mixture. These conflicting requirements may be accommodated through adjustments in the quantity of steam supplied to the reactor and the degree of oxygen enrichment of the air. The oxidation reactions may be represented generically as:

$$C_xH_yO_z + O_2 \rightarrow CO_2 + H_2O$$

In the continuous method embodiment, the direction of flow of the air and the solid charge in the reactor is co-current. This ensures that any vaporized hydrocarbons, or incompletely hydrolyzed/oxidized hydrocarbon degradation products, are carried from the region of high concentration obtaining near the blended feed influent port to a region of low concentration and higher temperature nearer the exit, thereby providing an enhanced opportunity for further reaction.

The decontaminated soil product, which is normally very dry, dusty and extremely hydrophobic, leaves the reactor and passes through a spray of surfactant en route to another blender (e.g. a conventional pug mill) where it is mixed with a sufficient quantity of water to permit dust-free transfer to the final disposal site and/or compaction into a dense, stable monolith which, upon curing, provides virtually permanent encapsulation of any inorganic or surviving, trace organic residues.

The surfactant or wetting agent may be any of a number of commercially available long chain organic molecules, e.g. industrial or domestic soaps and detergents. However, it is preferable that this agent be a solution of approximately 5% sodium hydroxide in water which is sprayed onto the dry reactor effluent in sufficient volume to ensure the desired water-wetting and compaction qualities of the final product from the process. The actual quantity will be determined by the nature of the soil, the quantity of lime employed, etc.

and will range from about 1% to about 10% of the weight of the process product.

As described in the above-identified copending application, of which the present invention is a continuation-in-part, the lime conditioning agent comprises a liquid blend of certain liquid saturated fatty acids (coconut oil, or babassu oil or palm kernel oil) and certain glycerides of fatty acids. The resulting blend is a liquid at room temperature, thereby allowing it to be very easily and uniformly combined with the fine-ground lime. This procedure is accomplished with the aid of a spray nozzle which introduces the hydrophobizing agent into a rising air stream carrying the fine lime particles.

The chief constituents of coconut oil are the glyceride of lauric acid, with appreciable amounts of the glycerides of capric, myristic, palmitic and oleic acids. The general composition of fatty acids in coconut oil is as follows: caprylic, about 8.0; capric, about 7.0; lauric, about 48.0; myristic, about 17.5; palmitic, about 8.2; stearic, about 2.0; oleic, about 6.0 and linoleic, about 2.5.

In one preferred coconut oil, the approximate composition of the fatty acids is as follows: lauric acid, about 47%; myristic acid, about 19%; palmitic acid, about 9%; oleic acid, about 7%; stearic acid, about <3% and other (lower molecular weight fatty acids), about >15%.

The approximate composition of fatty acids in babassu oil is as follows: caprylic, about 6.5; capric, about 2.7; lauric, about 45.8; myristic, about 19.9; palmitic, about 6.9; and oleic, about 18.1.

The approximate composition of fatty acids in palm kernel oil is as follows: caprylic, 3.0; capric, about 3.0; lauric, about 52.0; myristic, about 15.0; palmitic, about 7.5; stearic, about 2.5; oleic, about 16.0; and linoleic, about 1.0.

A preferred liquid fatty acid mixture is that known by the trademark INDUSTRENE 365 TM of Hunko Products Division; National Dairy Products Corporation. A preferred coconut oil is that known by the trademark VICTORY 76 TM of Bareco Division; Petrolite Corp.

As taught in the above-identified copending application, of which the present invention is a continuation-in-part, the most efficacious composition of the conditioning agent blend should be:
1. 73% INDUSTRENE 365 TM. and
2. 27% VICTORY 76 TM.

The desired characteristic of the conditioning agent is that it virtually inhibit the lime hydration until the lime is mechanically blended with the contaminated soil with the aid of vigorous stirring, then allowed to remain undisturbed, at which time the reaction should occur at a high rate as indicated by a rapid and extensive rise in temperature. This behaviour is seen to be optimum when the concentration of the conditioning agent in the treated lime is within the range of 0.5% and 2.5%, with the optimum performance noted at approximately 1.0%. It is possible that other blends of oil and fatty acids would perform equally well. For example, blends of liquid fatty acids with babassu oil or with palm kernel oil may be useful.

The conditioning agent also acts as an activator/initiator in a method for rendering waste substances harmless.

In the novel method of the present invention, as will be described in greater detail hereinafter, at some point during the lime hydration reaction, the conditioning agent begins to react with the lime. Coupled with the destruction of the lime is the release of sufficient heat to raise the temperature of the mass significantly above about 100° C., the boiling point of water. Temperatures in excess of about 150° C. may be achieved. At this temperature, hydration, which clearly involves water as a reactant, must soon cease and hydration of the agent takes place. In mixtures of fatty acid activated lime and hydrocarbon contaminated soil, temperatures in excess of about 400° C. have been observed. This behaviour of the agent as an activator/initiator contributes to the chemical destruction of the hydrocarbon contaminants originally present in the waste soil and is an important mechanism in the operation of the above-described novel method.

BRIEF DESCRIPTION OF THE DRAWINGS

In the accompanying drawing, the single Figure is a schematic process flowsheet of the method and system of one embodiment of this invention.

DESCRIPTION OF PREFERRED EMBODIMENT OF SYSTEM

Figure 1:
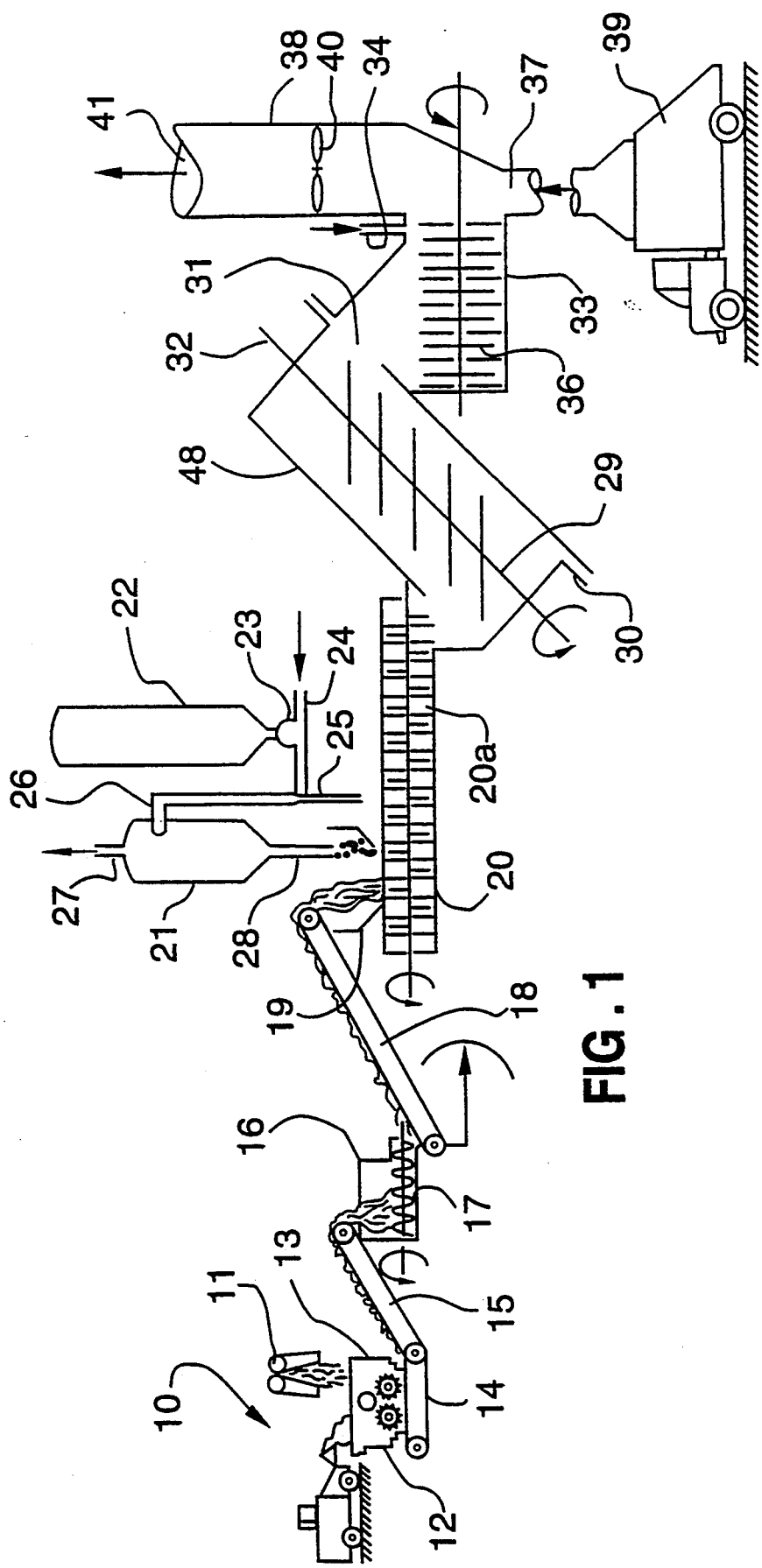

The contaminated soil is removed from the area of contaminants and is fed, by a front-loader 10 either to a jaw crusher 11 or a roll crusher 12 to a hopper 13 provided with a conveyor system 14. Conveyor system 14 feeds an inclined ramp portion 15 leading to a hopper 16 provided with a feed rate control screw soil feeder 17, driven by means (not shown) in the direction shown by the arrow. Screw soil feeder 17 feeds soil to a second weigh-type conveyor system 18 where the soil is fed through a blender hopper 19 to a blender 20 provided with suitable means 20a for blending.

The lime is activated in the manner previously described in the activity apparatus 21 shown. Lime is stored in a lime storage vessel 22 where it is fed from a rotary valve 23 at the bottom of the lime storage vessel 22, and is carried by air, supplied through line 24, mixed with conditioned fatty acid composition (as previously described) in line 25 to combined inlet line 26 to activated lime storage and feed apparatus 21. Air is exhausted through vent 27. The conditioned lime is discharged via outlet 28 through the blender hopper 19 to the blender 20. From the blender 20, the blended lime/soil charge is fed to an inclined reactor 48 provided with an upwardly feeding screw conveyor 29 rotated by motor means (not shown) in the direction shown. Oxidizing air together with water and/or steam as determined by the stoichiometry and thermal requirements of the chemical reactions is fed co-currently to the flow of the charge through air inlet 30 to the inclined reactor 48.

At the exit 3 1 from the inclined reactor 48, the decontaminated soil is sprayed with a suitable wetting agent as previously described through spray nozzle 32 and is fed to a pug mill 33. At the pug mill 33, the decontaminated soil is wetted with water through inlet 34, and is discharged by horizontal screw conveyor 36, rotated by motor means (not shown) in the direction shown to the outlet 37 of a discharge tower 38 to a suitable truck 39.

The discharge tower 38 includes an internal fan 40 which forces air outwardly to 41 to a cleanup zone (not shown) and maintains a slight negative pressure in the reactor of approximately 1 cm to 3 cm water vacuum to minimize fugitive emissions.

The decontaminated soil may be fed to a compaction zone (not shown) and/or to landfill.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A method for the treatment of hydrocarbon-contaminated soil by at least one of chemical hydrolysis and oxidation of said hydrocarbons in said hydrocarbon-contaminated soil, said method comprising:
   1) conditioning lime with a fatty acid activator, said fatty-acid activator comprising a liquid blend of a) a mixture of liquid fatty acids having from about 6 to about 12 carbon atoms, and b) a mixture of glycerides of fatty-acids having from about 8 to about 18 carbon atoms, thereby to provide conditioned lime;
   2) intimately blending said conditioned lime in a ratio of from about 1-6 to about 1-1 with physically-preconditioned, moist, hydrocarbon-contaminated soil, under conditions of high shear, the degree of blending being at least near microscopic level, thereby to provide blended conditioned lime/soil;
   3) conveying a charge of said blended conditioned lime/soil to an enclosed reaction vessel and carrying out hydration of said lime in said blended conditioned lime/soil charge;
   4) retaining the heat of said hydration reaction within said vessel, whereby hydrolysis of at least one of said fatty acid conditioner and said hydrocarbon contaminants in said soil is initiated;
   5) substantially simultaneously introducing at least one of air and oxygen-enriched air into said reaction vessel together with at least one of steam and water, thereby to effect a flameless, intermediate-temperature oxidation of at least one of said hydrocarbons and hydrolysed degradation products of said hydrocarbons, thereby to provide decontaminated soil product;
   6) discharging decontaminated soil product from said reaction vessel by passing said decontaminated soil product, in dry, dusty, hydrophobic form through a treating zone where it is sprayed with a surfactant, thereby to provide a surfactant-treated decontaminated soil solid and
   7) passing said surfactant-treated decontaminated-soil solid to a blender where it is mixed with sufficient water, in an amount ranging from about 5% to about 25% based on the quantity of surfactant-treated decontaminated soil solid, thereby to provide a substantially dust-free product.

2. The method claim 1 wherein said hydrocarbon contaminated soil is moist and has a maximum grain size less than about 5 cm.

3. The method of claim 1 wherein said liquid fatty-acid mixture a) comprises a preponderant amount of caprylic acid and capric acid; and wherein said glycerides mixture b) is coconut oil, the composition of which comprises: the glyceride of lauric acid, with appreciable amounts of the glycerides of capric, myristic, palmitic and oleic acids.

4. The method of claim 1 wherein said intimate blending is provided by an apparatus capable of imparting sufficient shear and mixing action, said apparatus being selected from the group consisting of a concrete mixer and a pug mill.

5. The method of claim 1 wherein said enclosed reaction vessel is subjected to continuous feeding of said blended lime/soil charge, whereby said blended lime/soil charge moves through said reaction vessel.

6. The method of claim 5 wherein the direction of flow of said introduced air is co-current to the direction of flow of said blended lime/soil charge through said reaction vessel.

7. The method of claim 5 wherein said introduced air flows from the point of introduction into the reaction vessel to the point of discharge from the reaction vessel.

8. The method of claim 1 wherein said enclosed reaction vessel is subjected to batchwise feeding of said blended lime/soil charge, said charge being retained in said reaction vessel for a predetermined period of time, of from about 10 minutes to about 45 minutes which is adequate for completion of all hydration, hydrolysis and oxidation reaction.

9. The method of claim 1 wherein said surfactant comprises at least one of commercial soaps, industrial soaps and detergents, each at a concentration ranging from about 30% to about 80% by weight.

10. The method of claim 9 wherein said surfactant comprises an aqueous solution of sodium hydroxide.

11. The method of claims 10 wherein the concentration of said sodium hydroxide is from about 5% to about 10% by weight.

12. The method of claim 1 wherein said blender comprises a pug mill.

13. In a method for the treatment of hydrocarbon-contaminated soil by at least one of chemical hydrolysis and oxidation of said hydrocarbons in said hydrocarbon-contaminated soil, including subjecting a blend of conditioned lime and hydrocarbon-contaminated soil to a hydration reaction in an enclosed reaction vessel, said conditioned lime comprising an intimate blend of lime and fatty-acid activator, said fatty-acid activator comprising a liquid blend of a) a mixture of liquid fatty-acids having from about 6 to about 12 carbon atoms, and b) a mixture of glycerides of fatty acids having from about 8 to about 18 carbon atoms, thereby to provide said conditioned lime, thereby to provide a decontaminated soil product, the improvement comprising: at least one of introducing air and oxygen-enriched air into said reaction vessel together with at least one of steam and water in an amount required to initiate, sustain and complete said hydrolysis and oxidation reactions, thereby to effect a flameless, intermediate-temperature, oxidation of said hydrocarbon and hydrolysed degradation products of said hydrocarbon.

14. In a method for the treatment of hydrocarbon-contaminated soil by at least one of chemical hydrolysis and oxidation of said hydrocarbons in said hydrocarbon-contaminated soil, including subjecting a blend of conditioned lime, and hydrocarbon-contaminated soil to a hydration reaction in an enclosed reaction vessel, said conditioned lime comprising an intimate blend of lime and a fatty-acid activator, said fatty-acid activator comprising a liquid blend of a) a mixture of liquid fatty acids having from about 6 to about 12 carbon atoms, and b) a mixture of glycerides of fatty acids having from about 8 to about 18 carbon atoms, thereby to provide said conditional lime, thereby to provide a decontaminated soil product, the improvement comprising: discharging said decontaminated soil product from said reaction vessel by passing said decontaminated soil product, in dry, dusty hydrophobic form through a treating zone where it is sprayed with a surfactant.

15. In a method for the treatment of hydrocarbon-contaminated soil by at least one of chemical hydrolysis and oxidation of said hydrocarbons in said hydrocarbon-contaminated soil, including subjecting a blend of conditioned lime, and hydrocarbon-contaminated soil to a hydration reaction in an enclosed reaction vessel, said condition lime comprising an intimate blend of lime and a fatty-acid activator, said fatty-acid activator comprising a liquid blend of a) a mixture of liquid fatty acids having from about 6 to about 12 carbon atoms, and b) a mixture of glycerides of fatty-acids having from about 8 to about 18 carbon atoms, thereby to provide conditioned lime, thereby to provide a decontaminated soil product, the improvement comprising: discharging said decontaminated soil product from said reaction vessel by passing said decontaminated soil product, in dry, dusty hydrophobic form through a treating zone where it is sprayed with a surfactant, thereby to provide surfactant-treated decontaminated soil product; and blending said surfactant-treated decontaminated soil product with sufficient water, in an amount ranging from about 5% to about 25% based on the quantity of said surfactant-treated decontaminated soil product to provide a substantially dust-free product.

* * * * *